United States Patent
Veeningen

(10) Patent No.: US 11,088,823 B2
(45) Date of Patent: Aug. 10, 2021

(54) PINOCCHIO/TRINOCCHIO ON AUTHENTICATED DATA

(71) Applicant: KONINKLIJKE PHILIPS N.V., Eindhoven (NL)

(72) Inventor: Meilof Geert Veeningen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 224 days.

(21) Appl. No.: 16/475,421

(22) PCT Filed: Dec. 29, 2017

(86) PCT No.: PCT/EP2017/084795
§ 371 (c)(1),
(2) Date: Jul. 2, 2019

(87) PCT Pub. No.: WO2018/127456
PCT Pub. Date: Jul. 12, 2018

(65) Prior Publication Data
US 2019/0334695 A1    Oct. 31, 2019

Related U.S. Application Data

(60) Provisional application No. 62/608,650, filed on Dec. 21, 2017, provisional application No. 62/443,338, filed on Jan. 6, 2017.

(51) Int. Cl.
*H04L 29/06* (2006.01)
*H04L 9/32* (2006.01)
(Continued)

(52) U.S. Cl.
CPC .............. *H04L 9/008* (2013.01); *G06F 17/16* (2013.01); *H04L 9/0825* (2013.01); *H04L 9/3026* (2013.01); *H04L 9/3218* (2013.01)

(58) Field of Classification Search
CPC ..... G06F 17/16; H04L 2209/46; H04L 9/008; H04L 9/0825; H04L 9/3026; H04L 9/3218
See application file for complete search history.

(56) References Cited

U.S. PATENT DOCUMENTS 7,290,133 B1 * 10/2007 Montgomery ........ H04L 9/3263
713/156
8,892,865 B1 * 11/2014 Roth ..................... H04L 9/0822
713/150
(Continued)

FOREIGN PATENT DOCUMENTS

WO    2016155804 A1    10/2016

OTHER PUBLICATIONS

International Search Report and Written Opinion for International Application No. PCT/EP2017/084795, filed Dec. 29, 2017, 19 pages.
(Continued)

*Primary Examiner* — Gary S Gracia

(57) ABSTRACT

According to an aspect, there is provided a first node for use in a system, the system comprising one or more trusted source nodes, one or more worker nodes and a verifier node, wherein the first node is configured to determine a trusted input commitment key for a trusted input to be input into a computation that is to be evaluated by the one or more worker nodes, wherein the trusted input commitment key is for use by the one or more trusted source nodes in forming a trusted input commitment of one or more trusted inputs; determine a computation evaluation key for use by the one or more worker nodes in determining a proof that a computation on one or more trusted inputs is correct and that the one or more trusted inputs were used in the computation, wherein the computation evaluation key comprises key material for one or more trusted input wires that are for (Continued)

inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that represent the computation; determine a computation verification key for use by the verifier node in verifying the result of the computation by the one or more worker nodes; and publish the trusted input commitment key, the computation evaluation key and the computation verification key. A corresponding method of operating a first node is provided. Other aspects also provide a trusted source node, a worker node and a verifier node, and methods of operating the same.

15 Claims, 6 Drawing Sheets

(51) Int. Cl.
*H04L 9/00* (2006.01)
*G06F 17/16* (2006.01)
*H04L 9/08* (2006.01)
*H04L 9/30* (2006.01)

(56) References Cited

U.S. PATENT DOCUMENTS

| | | | | |
|---|---|---|---|---|
| 10,547,457 | B1* | 1/2020 | Duccini | H04L 63/126 |
| 2006/0117181 | A1* | 6/2006 | Brickell | H04L 9/3271 |
| | | | | 713/176 |
| 2007/0256125 | A1* | 11/2007 | Chen | H04L 9/3263 |
| | | | | 726/18 |
| 2009/0228701 | A1* | 9/2009 | Lin | H04L 9/321 |
| | | | | 713/155 |
| 2009/0313475 | A1* | 12/2009 | Roscoe | H04L 63/065 |
| | | | | 713/181 |
| 2011/0099367 | A1* | 4/2011 | Thom | H04L 9/0877 |
| | | | | 713/156 |
| 2012/0144459 | A1* | 6/2012 | Nguyen | H04L 9/0891 |
| | | | | 726/5 |
| 2014/0258736 | A1* | 9/2014 | Merchan | G06F 21/62 |
| | | | | 713/193 |
| 2014/0298455 | A1* | 10/2014 | Livshits | H04L 9/3221 |
| | | | | 726/22 |
| 2015/0100785 | A1* | 4/2015 | Joye | H04L 9/14 |
| | | | | 713/168 |
| 2017/0149747 | A1* | 5/2017 | Wood | H04L 9/0869 |
| 2018/0159689 | A1* | 6/2018 | Keuffer | H04L 9/0643 |
| 2018/0176229 | A1* | 6/2018 | Bathen | H04W 12/106 |

OTHER PUBLICATIONS

Backes, et al. "ADSNARK: Nearly Practical and Privacy-Preserving Proofs on Authenticated Data", 2015 IEEE Symposium on Security and Privacy, pp. 271-286.

Costello, et al., "Geppetto: Versatile Verifiable Computation", 2015 IEEE Symposium on Security and Privacy, May 1, 2015, pp. 253-270.

Schoenmakers, et al., "Trinocchio: Privacy-Friendly Outsourcing by Distributed Verifiable Computation", International Association for Cryptologic Research, vol. 20160707, Jul. 7, 2016, pp. 1-33.

Ben-Sasson, et al., "Succinct Non-Interactive Arguments for a von Neumann Architecture", IACR Cryptology ePrint Archive, 2013:879, 2013.

Lipmaa, H., "Prover-Efficient Commit-And-Prove Zero-Knowledge SNARKs", from book Progress in Cryptology—Africacrypt 2016, 8th International Conference on Cryptology in Africa, Mes, Morocco, Apr. 13-15, 2016, Proceedings, pp. 185-206.

Kosba, A., "TrueSet: Faster Verifiable Set Computations", Paper included in the Proceedings of the 23rd USENIX Security Symposium, Aug. 20-22, 2014, San Diego, CA, pp. 765-780.

Virza, M., "SNARKs for C: Verifying Program Executions Succintly and in Zero Knowledge", B.Sc., University of Latvia 2011, Submitted to the Dept. of Electrical Engineering and Computer Science for the Degree of Master of Science in Computer Science and Engineering at the Massachusetts Institute of Technology, 72 pages.

* cited by examiner

PINOCCHIO/TRINOCCHIO ON AUTHENTICATED DATA

CROSS-REFERENCE TO RELATED APPLICATIONS

The present application is U.S. National Phase application under 35 U.S.C § 371 of International Application No. PCT/EP2017/084795, filed on Dec. 29, 2017, which claims priority to and benefit of U.S. Provisional Application Ser. No. 62/443,338, filed Jan. 6, 2017, and U.S. Provisional Application Ser. No. 62/608,650, filed Dec. 21, 2017, their entirety of which are hereby incorporated by reference herein.

TECHNICAL FIELD

The disclosure relates to the outsourcing of computations to an untrusted third party, and to the verification of the correctness of the computation result.

BACKGROUND

When outsourcing a computation to the cloud, it is important to know that the returned computation result is correct. There are three existing approaches: outsourcing the computation to several workers and comparing the results; relying on trusted hardware that the worker has deployed; and letting the worker cryptographically prove correctness. A solution in this latter direction is the Pinocchio system for verifiable computation (as described in "Pinocchio: Nearly Practical Verifiable Computation" by B. Parno, J. Howell, C. Gentry, and M. Raykova in Proceedings of S&P, 2013) and variants. In particular, the "Trinocchio" variant (described in "Trinocchio: Privacy-friendly outsourcing by distributed verifiable computation" by B. Schoenmakers, M. Veeningen, and N. de Vreede, IACR Cryptology ePrint Archive, 2015:480, 2015) shows that correctness guarantees can be combined with multi-party computation techniques to ensure not just correctness but also privacy with respect to the worker, by outsourcing the computation to several workers that collaborate to produce the proof.

In Pinocchio/Trinocchio, a verifier asks a worker to compute a function on the inputs of its choice. However, consider a setting where the worker's computation is a query of the verifier on a sensitive database from a trusted source. For instance, consider an insurer requesting statistics on information coming from a biosensor: the sensor itself is not powerful enough to perform computation and it is not always on-line, so the computation needs to be outsourced. But then it is difficult for the insurer to be sure that the statistics use the data from the biosensor, while at the same time it is difficult for the user to be sure that the insurer does not learn any information about the sensor data apart from the statistics. Similar use cases exist in areas like smart metering and financial auditing. Alternatively, in the case of a distributed computation, two functions may refer to a shared state consisting of a number of values. For instance, this shared state may comprise values that are output by the first function and input to the second function. In this case, these values may be regarded as a trusted input of both functions. Hence, outsourcing computations are considered where, apart from the input by the verifier, there are also trusted inputs from one or more trusted sources. The verifier is supposed to learn the output of the computation and be ensured that it is correct, but it should not learn any additional information about these trusted inputs. Generically, the solution in this setting (as discussed in "ADSNARK: nearly practical and privacy-preserving proofs on authenticated data" by M. Backes, M. Barbosa, D. Fiore, and R. M. Reischuk, in 2015 IEEE Symposium on Security and Privacy, S P 2015, San Jose, Calif., USA, May 17-21, 2015, pages 271-286, 2015 and "Geppetto: Versatile verifiable computation" by C. Costello, C. Fournet, J. Howell, M. Kohlweiss, B. Kreuter, M. Naehrig, B. Parno, and S. Zahur, in Proceedings of S&P '15, pages 253-270, 2015) is to let sources provide some sort of representation of the trusted inputs; and let the verifier check the correctness of the computation with respect to this representation. Verification requires: (1) a representation of the trusted inputs; (2) verification keys to verify this representation; (3) outputs of the computation; (4) a proof that the outputs are correct with respect to the trusted inputs; and (5) a verification key to verify the proof of correctness of the computation. Here, (2) and (5) come from a central authority (CA); (1) comes from the trusted source(s); and (3) and (4) come from the worker (s). Here, the verification key for the computation may or may not depend on the verification key for the inputs (i.e., on the particular trusted source providing the input).

SUMMARY

The two approaches in "ADSNARK: nearly practical and privacy-preserving proofs on authenticated data" and "Geppetto: Versatile verifiable computation" may be used to prove correctness of a computation with respect to authenticated inputs in Pinocchio-type verifiable computations. One generic approach (discussed in "Geppetto: Versatile verifiable computation" and referred to as 'the generic construction' in "ADSNARK: nearly practical and privacy-preserving proofs on authenticated data" paper) is to use as input representation one single (constant-sized) signature over all inputs. Then the proof of correctness includes a proof that there exist a set of inputs corresponding to the signature and the computation result. The drawback of this approach is that there is a large overhead for the worker. This is because performing signature verification inside a verifiable computation is expensive.

In the alternative approach, known as 'ADSNARK' (which is described in "ADSNARK: nearly practical and privacy-preserving proofs on authenticated data") there is a separate representation for each item in the input that is presented to the verifier. This representation consists of a commitment to the input and a signature on this commitment. The signatures are separately verified, whereas the commitments can be combined to verify that the underlying inputs were indeed used in the computation. This has a much smaller overhead for the worker (in particular, on one example it is 24.5 times faster than the generic solution), but it has the drawback that it introduces an overhead for the verifier, for whom storage and verification effort both become linear in the number of trusted inputs (previously, they did not depend on this number).

There is therefore a need for improvements over existing techniques and algorithms that minimises the overhead for both the worker and the verifier.

Thus, various embodiments described herein provide a new way to authenticate trusted inputs for Pinocchio and variants like Trinocchio with low overhead for both worker and verifier. A modified input representation is provided that allows trusted inputs to be represented in a constant-size representation; and a new way is provided to embed the proof that a computation corresponds to this representation of the trusted inputs into an already existing, similar, check that is already present in the proof. Hence, a single representation represents the whole data set but with less overhead. When data is from one trusted source, the solutions herein have virtually no overhead for the worker or verifier. When using data from multiple trusted sources in one computation, there is no worker overhead, but for the verifier, the proof size and verification time increase slightly better than linearly in the number of trusted sources. Therefore, compared to other solutions, the (large) worker overhead is eliminated and verifier overhead is reduced (in the case of multiple sources) or eliminated.

According to a first specific aspect, there is provided a first node for use in a system, the system comprising one or more trusted source nodes, one or more worker nodes and a verifier node, wherein the first node is configured to determine a trusted input commitment key for a trusted input to be input into a computation that is to be evaluated by the one or more worker nodes, wherein the trusted input commitment key is for use by the one or more trusted source nodes in forming a trusted input commitment of one or more trusted inputs; determine a computation evaluation key for use by the one or more worker nodes in determining a proof that a computation on one or more trusted inputs is correct and that the one or more trusted inputs were used in the computation, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that represent the computation; determine a computation verification key for use by the verifier node in verifying the result of the computation by the one or more worker nodes; and publish the trusted input commitment key, the computation evaluation key and the computation verification key.

According to a second aspect, there is provided a method of operating a first node in a system, the system comprising one or more trusted source nodes, one or more worker nodes and a verifier node, wherein the method comprises determining a trusted input commitment key for a trusted input to be input into a computation that is to be evaluated by the one or more worker nodes, wherein the trusted input commitment key is for use by the one or more trusted source nodes in forming a trusted input commitment of one or more trusted inputs; determining a computation evaluation key for use by the one or more worker nodes in determining a proof that a computation on one or more trusted inputs is correct and that the one or more trusted inputs were used in the computation, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that represent the computation; determining a computation verification key for use by the verifier node in verifying the result of the computation by the one or more worker nodes; and publishing the trusted input commitment key, the computation evaluation key and the computation verification key.

According to a third aspect, there is provided a worker node for use in a system, the system comprising a first node, one or more trusted source nodes and a verifier node, wherein the worker node is configured to obtain a computation evaluation key for a computation to be performed by the worker node, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that are dependent on polynomials representing the computation; receive one or more trusted inputs for the computation; evaluate the computation using the received one or more trusted inputs to determine values for one or more internal wires of the computation and one or more output wires of the computation; and determine a proof that the computation on the one or more trusted inputs is correct and that the one or more trusted inputs were used in the computation using the computation evaluation key.

According to a fourth aspect, there is provided a method of operating a worker node in a system, the system comprising a first node, one or more trusted source nodes and a verifier node, wherein the method comprises obtaining a computation evaluation key for a computation to be performed by the worker node, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that are dependent on polynomials representing the computation; receiving one or more trusted inputs for the computation; evaluating the computation using the received one or more trusted inputs to determine values for one or more internal wires of the computation and one or more output wires of the computation; and determining a proof that the computation on the one or more trusted inputs is correct and that the one or more trusted inputs were used in the computation using the computation evaluation key.

According to a fifth aspect, there is provided a verifier node for use in a system, the system comprising a first node, one or more trusted source nodes and one or more worker nodes, wherein the verifier node is configured to obtain a trusted input verification key and computation verification key; obtain, from the one or more trusted source nodes, a trusted input commitment, the trusted input commitment comprising a representation of one or more trusted inputs that have been input by the one or more trusted source nodes to a computation; obtain, from one or more worker nodes, an output of the computation and a proof that the computation on the one or more trusted inputs by the one or more worker nodes is correct and that the one or more trusted inputs were used in the computation; and determine whether the computation on the one or more trusted inputs is correct and whether the trusted inputs were used in the computation using the obtained trusted input verification key, obtained computation verification key, obtained trusted input commitment and obtained proof.

According to a sixth aspect, there is provided a method of operating a verifier in a system, the system comprising a first node, one or more trusted source nodes and one or more worker nodes, wherein the method comprises obtaining a trusted input verification key and computation verification key; obtaining, from the one or more trusted source nodes, a trusted input commitment, the trusted input commitment comprising a representation of one or more trusted inputs that have been input by the one or more trusted source nodes to a computation; obtaining, from one or more worker nodes, an output of the computation and a proof that the computation on the one or more trusted inputs by the one or more worker nodes is correct and that the one or more trusted inputs were used in the computation; and determining whether the computation on the one or more trusted inputs is correct and whether the trusted inputs were used in the computation using the obtained trusted input verification key, obtained computation verification key, obtained trusted input commitment and obtained proof.

According to a seventh aspect, there is provided a computer program product comprising a computer readable medium having computer readable code embodied therein, the computer readable code being configured such that, on execution by a suitable computer or processor, the computer or processor is caused to perform any of the method aspects set out above.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Figure 1:
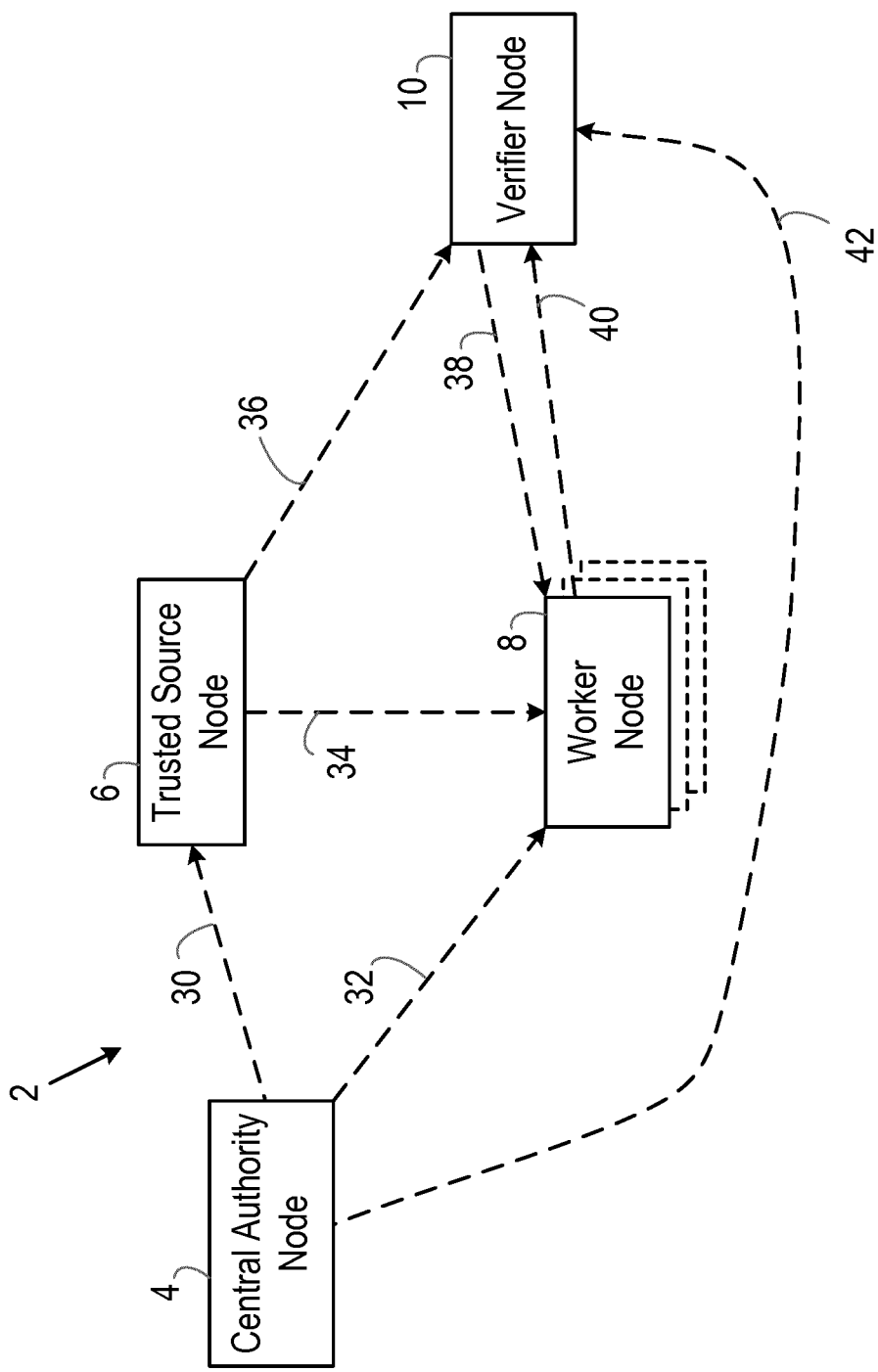
FIG. 1 is an illustration of a system implementing the techniques described herein.

FIG. 1 is a block diagram of a system 2 in which the techniques and principles described herein may be implemented. The system 2 comprises a first node 4 (which is also referred to herein as a central authority or central authority node 4), an input node 6 (which is also referred to herein as a 'trusted source' or 'trusted source node'), one or more worker nodes 8 (which is also referred to herein as a 'worker') and a verifier node 10 (which is also referred to herein as a 'verifier').

Where the techniques and principles described herein are applied to Pinocchio, the system 2 comprises a single worker node 8 that performs the computation. Where the techniques and principles described herein are applied to Trinocchio, the system 2 comprises two or more worker nodes 8 that cooperate to perform the computation.

Broadly, the system 2, particularly the central authority node 4 and the one or more worker nodes 8, are provided to perform a computation on one or more items of input data (also referred to herein as a trusted input or trusted input data) provided by the input node 6. The correctness of the output of the computation is verified by the verifier node 10.

In some embodiments, the verifier node 10 may request that the computation is performed on trusted input data owned or stored by the input node 6, and the input node 6 can provide the trusted input data as an input to the computation without the worker node(s) 8 or verifier node 10 learning the content of the data.

In some embodiments, the input node 6 may request a computation on its trusted input data, and the verifier node 10 can verify that the computation is (or was) performed correctly.

In some embodiments, the verifier node 10 may also provide an input to the computation along with the trusted input from the input node 6.

Each of the nodes 4, 6, 8, 10 are interconnected to enable data and information exchange therebetween, for example via a network, such as the Internet, although one or more of any of the nodes 4, 6, 8, 10 may be co-located or otherwise interconnected via a local area network.

Each of the nodes 4, 6, 8, 10 can be in the form of any type of computing device or electronic device, such as a computer, a server, a laptop, a tablet, a smartphone, etc.

Figure 2:
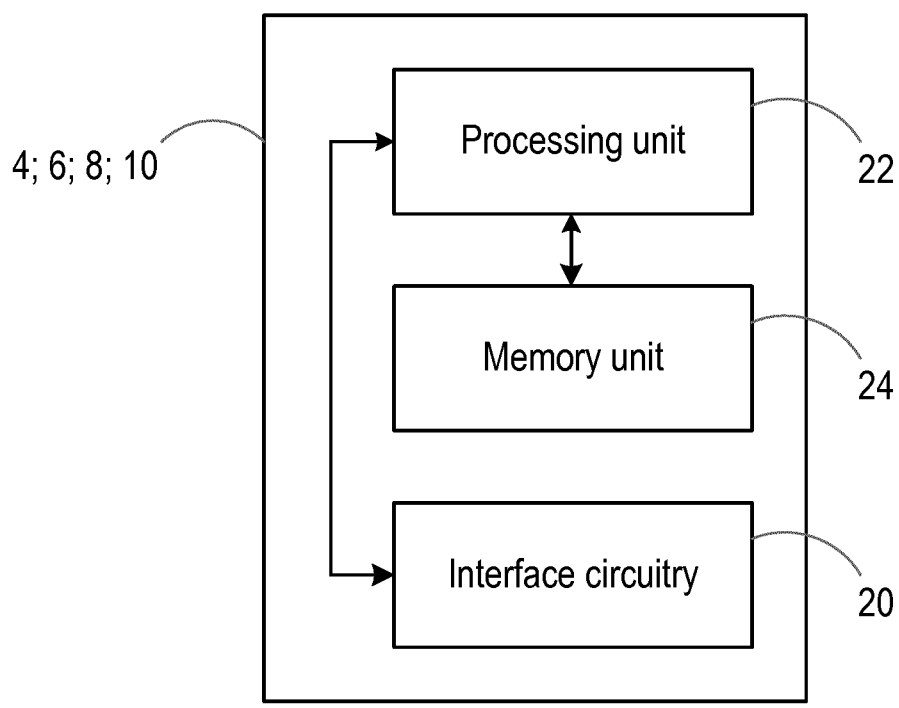
FIG. 2 is a block diagram of a node according to various embodiments.

FIG. 2 is a block diagram illustrating the components of a node according to various embodiments of the techniques described herein. Any of the central authority node 4, the input node 6, the worker node(s) 8 and the verifier node 10 can be implemented as shown in FIG. 2.

According to FIG. 2, the node includes interface circuitry 20 for enabling a data connection to and/or data exchange with other nodes, such as other nodes in the system 2. In particular the interface circuitry 20 can enable a connection between the node 4, 6, 8, 10 and a network, such as the Internet, via any desirable wired or wireless communication protocol. For example, the interface circuitry 20 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.).

The node further includes a processing unit 22 for performing operations on data and for generally controlling the operation of the node. The interface circuitry 20 may be connected to the processing unit 22. The node further includes a memory unit 24 for storing any data required for the execution of the techniques described herein and for storing computer program code for causing the processing unit 22 to perform method steps as described in more detail below and as appropriate for the role that the node 4; 6; 8; 10 has in the system 2. The memory unit 24 may be connected to the processing unit 22.

The processing unit 22 can be implemented in numerous ways, with software and/or hardware, to perform the various functions described herein. The processing unit 22 may comprise one or more microprocessors or digital signal processor (DSPs) that may be programmed using software or computer program code to perform the required functions and/or to control components of the processing unit 22 to effect the required functions. The processing unit 22 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 24 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

It will be appreciated that a practical implementation of any of the central authority node 4, input node 6, worker node 8 and verifier node 10 may include additional components to those shown in FIG. 2. For example the node can include a power supply, such as a battery, or components for enabling the node to be connected to a mains power supply. As another example, the node can comprise a user interface that includes one or more components that enables a user of the node to input information, data and/or commands into the node (as appropriate), and/or enables the node to output information or data to the user of the node. The user interface can comprise any suitable input component(s), including but not limited to a keyboard, keypad, one or more buttons, switches or dials, a mouse, a track pad, a touch-screen, a stylus, a camera, a microphone, etc., and the user interface can comprise any suitable output component(s), including but not limited to a display screen, one or more lights or light elements, one or more loudspeakers, a vibrating element, etc.

As noted above, various embodiments described herein provide a new way to authenticate trusted inputs for Pinocchio and variants like Trinocchio with low overhead for both worker and verifier. The techniques described herein provide a modified input representation that allows trusted inputs to be represented in a constant-size representation; and a new way to embed the proof that a computation corresponds to this representation of the trusted inputs into an already existing, similar, check that is already present in the proof. This means that a single input representation represents the whole data set, but with less overhead.

In more detail, the techniques described herein re-use Pinocchio's "linear combination consistency check" such that it not just enforces internal consistency of the proof, but also consistency of the proof with a representation of the trusted inputs. In Pinocchio, computations are modelled by quadratic equations. For instance, for an input $x_1$, a prover needs to compute $x_2=(x_1)^3$. Then $x_2$ is correct if and only if there exists internal wire value $x_3$ (i.e. a part of the computation) such that $x_3=x_1 \cdot x_1$ and $x_2=x_3 \cdot x_3$. When a prover in Pinocchio is asked to compute this function for an input $x_1$, it returns $x_2$ in the clear; an encoding of $x_3$; and a proof that $x_1; \ldots; x_3$ satisfy the given quadratic equations.

Specifically, the encoding of internal wires $x_{m+1}; \ldots; x_n$ contains four terms:

$$V = \sum_{i=m+1}^{n} x_i \cdot V_i \tag{1}$$

$$W = \sum_{i=m+1}^{n} x_i \cdot W_i \tag{2}$$

$$Y = \sum_{i=m+1}^{n} x_i \cdot Y_i \tag{3}$$

$$Z = \sum_{i=m+1}^{n} x_i \cdot (\beta \cdot (V_i + W_i + Y_i)) \tag{4}$$

where the elements $V_i$, $W_i$, $Y_i$ and $\beta \cdot (V_i+W_i+Y_i)$ are homomorphic encodings using an additively homomorphic encoding scheme. For instance, a value x may be encoded as $x \cdot g$, with g the generator of a discrete logarithm group (seen as an additive group) on which a symmetric cryptographic pairing is defined. This implies that, given encoding B of $\beta$, where $\beta$ is the discrete logarithm of $\beta \cdot (V_i+W_i+Y_i)$ with respect to $V_i+W_i+Y_i$; $V$; $W_i$ and $Y_i$ it is not feasible to compute $\gamma=\beta \cdot (V_i+W_i+Y_i)$, but it is possible to check if $\gamma$ indeed encodes the product of the values encoded by B and $V_i+W_i+Y_i$. Alternatively, a value x may be encoded using an additively homomorphic encryption scheme such as Paillier. In this case, a verifier that knows the secret key of the additively homomorphic encryption scheme can check if $\gamma$ encodes the product of the values encoded by B and $V_i+W_i+Y_i$ by decrypting the decoded values and verifying the relation on the plaintexts. In any case, B, $V_i$, $W_i$, $Z_i$ and $\beta \cdot (V_i+W_i+Z_i)$ are generated once by the central authority node 4.

An honest prover uses the same $x_i$ for each of V, W, Y and Z, but a corrupted prover may use different values for $x_i$ in order to prove correctness of an incorrect computation result. The term Z enables a linear combination consistency check that prevents this. Given B, V, W, Y and Z, any party can verify that $\beta \cdot (V+W+Y)=Z$, which implies that all use the same $x_i$.

Various embodiments described herein use this linear combination consistency check to prove consistency not just internally between V, W, Y and Z, but also between these elements and a representation of trusted inputs. Suppose that a computation uses input/output values $x_1, \ldots, x_l$, trusted inputs $x_{l+1}, \ldots, x_m$; and internal wires $x_{m+1}, \ldots, x_n$. To represent the trusted inputs, elements $I_0, I_{l+1}, \ldots, I_m$ are chosen (in a particular way), and the representation is defined as $$I = x_0 \cdot I_0 + \sum_{i=l+1}^{m} x_i \cdot I_i \tag{5}$$

for random $x_0$. Adding $x_0$ provides that the trusted inputs do not leak from this representation. It should be noted that the size of this representation (one element) is independent from the number of trusted inputs.

To prove that the trusted inputs represented by I were used in a particular computation, instead of elements $\{\beta \cdot (V_i+W_i+Y_i)\}_{i=m+1}^{n}$ for Z above, we use:

$$\{\beta \cdot (I_i+V_i+W_i+Y_i)\}_{i=l+1}^{m}, \{\beta \cdot (V_i+W_i+Y_i)\}_{i=m+1}^{n} \tag{6}$$

As before, it is checked that Z satisfies $\beta \cdot (I+V+W+Y)=Z$. For trusted inputs, this guarantees that the same $x_i$ were used in V, W, Y and I. For internal wires of the computation, guarantees are as above.

A detailed implementation of the techniques presented herein is described below for a Pinocchio-based system (as described in a simplified form in "Trinocchio: Privacy-friendly outsourcing by distributed verifiable computation") that enables the security of the original Pinocchio scheme to be (provably) preserved. However, it will be appreciated by those skilled in the art that the techniques presented herein can be applied to other variants of Pinocchio (including Trinocchio variants).

Pinocchio has a single worker node 8, but it is also possible, according to the techniques described herein, to distribute the computation between two or more (e.g. three) different workers 8 in a privacy-preserving way (i.e. so that no individual worker 8 learns any information about the trusted inputs or the inputs of the verifier 10) by a straightforward generalisation of Trinocchio.

Firstly, there is a one-time set-up by central authority 4. A ring $\mathbb{F}$ is fixed over which computations take place, a maximum number of inputs/outputs l, a maximum number of trusted inputs m-l, and a maximal "degree" of computations d>m. A random trapdoor s is selected, where s∈$\mathbb{F}$. Two homomorphic encodings $\langle\bullet\rangle_1 \in \mathbb{G}_1$, $\langle\bullet\rangle_2 \in \mathbb{G}_2$ are defined, and a bilinear map e: $\mathbb{G}_1 \times \mathbb{G}_2 \to \mathbb{G}_3$ that can be used to verify multiplicative relations between encoded elements is also defined. Below, the homomorphic operations on $\mathbb{G}_1$ and $\mathbb{G}_2$ can be seen as addition, and the homomorphic operation on $\mathbb{G}_3$ can be seen as multiplication.

Specifically, as homomorphic encoding, discrete logarithm groups with a cryptographic pairing may be used. In this case, the central authority sets up discrete logarithm groups $\mathbb{G}_1$, $\mathbb{G}_2$, $\mathbb{G}_3$ of order $|\mathbb{F}|$ with a pairing e: $\mathbb{G}_1 \times \mathbb{G}_2 \to \mathbb{G}_3$ for which the (4d+4)-PDH, d-PKE and (8d+8)-SDH assumptions (as described in "Pinocchio: Nearly Practical Verifiable Computation") hold. Here, $\mathbb{G}_3$ is again a discrete logarithm group. In this case, given generators $g_1$ of $\mathbb{G}_1$ and $g_2$ of $\mathbb{G}_2$ (written additively) and polynomial f∈$\mathbb{F}$ |x|, $\langle f\rangle_1$ is written for $f(s)\cdot g_1$ and $\langle f\rangle_2$ is written for $f(s)\cdot g_2$.

Alternatively, as homomorphic encoding, homomorphic encryptions may be used. In this case, the central authority sets up a homomorphic encryption scheme with plaintext space IF and generates a private/public key pair. Homomorphic encodings $\langle\bullet\rangle_1 \in \mathbb{G}_1$, $\langle\bullet\rangle_2 \in \mathbb{G}_2$ are both defined as encryption using this public key. The bilinear map e($\langle a\rangle_1$, $\langle b\rangle_2$) is defined by decrypting $\langle a\rangle_1$ and $\langle b\rangle_2$ to obtain a and b, respectively, and computing a·b. Hence, encodings in $\mathbb{G}_3$ are ring elements (where • is written for the addition operation in the ring). In this case, given polynomial f∈ $\mathbb{F}$ |x|, both $\langle f\rangle_1$ and $\langle f\rangle_2$ represent an encryption of the ring element f(s).

The central authority node 4 publishes public parameters $\mathbb{F}$, l, m, d, and the information required to produce encodings of ring elements according to the homomorphic encodings; it also publishes (in the case of discrete logarithm groups) or provides to the verifier (in the case of homomorphic encryptions) the information required to evaluate the bilinear map. In the latter case, the central authority node 4 does not publish the information required to evaluate the bilinear map for all nodes 6, 8, 10 as the information includes the private key used to produce the encodings, and the worker nodes 8 should not learn this key.

The central authority node 4 also 'sets-up' the trusted source 6. Given the trapdoor s, a random γ∈$\mathbb{F}$ is selected. A trusted input evaluation key (which is also referred to as a trusted input commitment key) $\langle\gamma\cdot s^j\rangle_1$ for j=l+1, l+2, ..., m is provided to the trusted source 6 and a trusted input verification key $\langle\gamma\rangle_2$ is published.

Next, a data representation is formed by the trusted source 6. Given trusted input evaluation key $\langle\gamma\cdot s^j\rangle$ and inputs $x_{l+1}, \ldots, x_m$, a random $x_0$ is picked and a trusted input representation (which is also re erred to as a trusted input commitment) is returned in the form:

$$\langle I\rangle_1 = x_o \cdot \langle 1\rangle_1 + \sum_{i=l+1}^{m} x_i \cdot \langle s^i\rangle_1, \quad (7)$$

$$\langle \gamma I\rangle_1 = x_o \cdot \langle \gamma\rangle_1 + \sum_{i=l+1}^{m} x_i \cdot \langle \gamma\cdot s^i\rangle_1$$

Next, the central authority node 4 sets up the trusted computation. Given the trapdoor s, random β, $\alpha_v$, $\alpha_w$, $\alpha_y$, $r_v$, $r_w$, $r_y = r_v \cdot r_w \in \mathbb{F}$ are picked. A set of d quadratic equations in variables $x_1, \ldots, x_n$ is constructed such that for inputs and outputs $x_1, \ldots, x_l$ and trusted inputs $x_{l+1}, \ldots, x_m$, there exist internal wires $x_{m+1}, \ldots, x_n$ satisfying all of the equations if and only if the function has been correctly computed. These equations are written as:

$$(v_0^i + v_1^i \cdot x_1 + \ldots + v_n^i \cdot x_n)\cdot(w_0^i + w_1^i \cdot x_1 + \ldots + w_n^i \cdot x_n) = (y_0^i + y_1^i \cdot x_1 + \ldots + y_n^i \cdot x_n) \quad (8)$$

with i=1, ..., d.

Distinct $\alpha_1, \ldots, \alpha_d \in \mathbb{F}$ are selected or picked.

The following function is defined $t(x)=(x-\alpha_1)\bullet \ldots \bullet(x-\alpha_d)$.

By Lagrange interpolation, let $v_0(x), \ldots, v_n(x)$ be the degree≤d-1 polynomials such that $v_i(\alpha_j)=v_j^i$, and similarly for $w_i(x)$, $y_i(x)$.

The following computation evaluation key is returned to the worker 8 (where c=0, ..., d; i=1, l+1, l+2, ..., n; j=m+1, ..., n; k=l+1, ..., m):

$$\langle s^c\rangle_1, \langle t\rangle_1, \langle \beta\cdot(r_v v_j + r_w w_j + r_y y_j)\rangle_1, \langle \beta\cdot(s^k + r_v v_k + r_w w_k + r_y y_k)\rangle_1, \langle r_v v_i\rangle_1, \langle r_v \alpha_v v_i\rangle_1, \langle r_v t\rangle_1, \langle r_v \alpha_v t\rangle_1,$$
$$\langle r_v \beta t\rangle_1, \langle r_w w_i\rangle_2, \langle r_w \alpha_w w_i\rangle_1, \langle r_w t\rangle_2, \langle r_w \alpha_w t\rangle_1,$$
$$\langle r_w \beta t\rangle_1, \langle r_y y_i\rangle_1, \langle r_y t\rangle_1, \langle r_y \alpha_y t\rangle_1, \langle r_y \beta t\rangle_1,$$
$$\langle r_y \alpha_y y_i\rangle_1, \quad (9)$$

This computation evaluation key comprises several elements, a set of consistency-checking elements shown in line 1 of equation (9) which includes the additional computation-independent polynomial element $s^k$, and computation-dependent polynomial elements for the left factor ($v_k$), right factor ($w_k$) and the product ($y_k$) of the set of multiplications that form the computation. In particular, the k-indexed consistency-checking elements in line 1 of equation (9) are key material for one or more trusted input wires that are for inputting the one or more trusted inputs into the computation, and it can be seen that the key material is derived from the trapdoor value, s, one or more polynomials evaluated in a point corresponding to the trapdoor value that are independent of polynomials representing the computation (i.e. $s^k$), and one or more polynomials evaluated in a point corresponding to the trapdoor value that are dependent on polynomials representing the computation (i.e. $v_k$, $w_k$, $y_k$).

The following computation verification key is published by the central authority node 4 (where i=0, ..., l):

$$\langle \alpha_v\rangle_2, \langle \alpha_w\rangle_2, \langle \alpha_y\rangle_2, \langle \beta\rangle_1, \langle \beta\rangle_2, \langle r_v v_i\rangle_1, \langle r_w w_i\rangle_2,$$
$$\langle r_y y_i\rangle_1, \langle r_y t\rangle_2 \quad (10)$$

The following relates to the computation by the worker 8. Given a computation evaluation key, trusted inputs and inputs from the verifier (if applicable), the worker 8 determines outputs of the computation and internal wire values of the computation such that $x_1, \ldots, x_n$ satisfy all of the above quadratic equations. The worker 8 generates random $\delta_v$, $\delta_w$, $\delta_y \in \mathbb{F}$ and computes:

$$h(x) = \frac{\sum_i x_i v_i \cdot \sum_i x_i w_i - \sum_i x_i y_i}{t} + \quad (11)$$
$$\delta_v w_0 + \sum_i \delta_v x_i w_i + d_w v_0 + \sum_i \delta_w x_i v_i + \delta_v \delta_w t - \delta_y$$

with i summing from 0 to n and $x_0=1$. If the equations are satisfied, this is a polynomial.

The worker 8 returns the output of the computation and the following proof (where $c=0, \ldots, d$; $i=l+1, l+2, \ldots, n$; $j=m+1, \ldots, n$; $k=l+1, \ldots, m$, $x_0=1$):

$$\langle V_{mid}\rangle_1 = \Sigma_i x_i \cdot \langle r_v v_i\rangle_1 + \delta_v \cdot \langle r_v t\rangle_1, \quad (12)$$

$$\langle \alpha_v V_{mid}\rangle_1 = \Sigma_i x_i \cdot \langle r_v \alpha_v v_i\rangle_1 + \delta_v \cdot \langle r_v \alpha_v t\rangle_1, \quad (13)$$

$$\langle W_{mid}\rangle_2 = \Sigma_i x_i \cdot \langle r_w w_i\rangle_2 + \delta_w \cdot \langle r_w t\rangle_2, \quad (14)$$

$$\langle \alpha_w W_{mid}\rangle_1 = \Sigma_i x_i \cdot \langle r_w \alpha_w w_i\rangle_1 + \delta_w \cdot \langle r_w \alpha_w t\rangle_1, \quad (15)$$

$$\langle Y_{mid}\rangle_1 = \Sigma_i x_i \cdot \langle r_y y_i\rangle_1 + \delta_y \cdot \langle r_y t\rangle_1 \quad (16)$$

$$\langle \alpha_y Y_{mid}\rangle_1 = \Sigma_i x_i \cdot \langle r_y \alpha_y y_i\rangle_1 + \delta_y \cdot \langle r_y \alpha_y t\rangle_2 \quad (17)$$

$$\langle Z\rangle_1 = \delta_v \langle r_v \beta t\rangle_1 + \delta_w \cdot \langle r_w \beta t\rangle_1 + \delta_y \cdot \langle r_y \beta t\rangle_1 + \Sigma_j x_j \cdot \langle \beta \cdot (r_v v_j + r_w w_j + r_y y_j)\rangle_1 + \Sigma_k x_k \cdot \langle \beta \cdot (s^k + r_v v_k + r_w w_k + r_y y_k)\rangle_1, \quad (18)$$

$$\langle H\rangle_1 = \langle h\rangle_1 = \Sigma_c h_c \cdot \langle s^c\rangle_1 \quad (19)$$

where $h_c$ are the coefficients of polynomial h.

The verification of the computation by the verifier 10 is as follows. The verifier 10 is provided with a trusted input verification key and a computation verification key from the central authority 4, a trusted input representation (commitment) from the trusted source 6, chosen inputs and obtained outputs $x_1, \ldots, x_l$, and a proof from the worker 8, the verifier 10 accepts the outputs if the following hold:

$$e(\langle I\rangle_1, \langle \gamma\rangle_2) = e(\langle \gamma I\rangle_1, \langle 1\rangle_2); \quad (20)$$

$$e(\langle V_{mid}\rangle_1, \langle \alpha_v\rangle_2) = e(\langle \alpha_v V_{mid}\rangle_1, \langle 1\rangle_2); \quad (21)$$

$$e(\langle \alpha_w\rangle_1, \langle W_{mid}\rangle_2) = e(\langle \alpha_w W_{mid}\rangle_1, \langle 1\rangle_2); \quad (22)$$

$$e(\langle Y_{mid}\rangle_1, \langle \alpha_y\rangle_2) = e(\langle \alpha_y Y_{mid}\rangle_1, \langle 1\rangle_2); \quad (23)$$

$$e(\langle I\rangle_1 + \langle V_{mid}\rangle_1 + \langle Y_{mid}\rangle_1, \langle \beta\rangle_2) \cdot e(\langle \beta\rangle_1, \langle W_{mid}\rangle_2) = e(\langle Z\rangle_1, \langle 1\rangle_2) \quad (24)$$

$$e(\langle V\rangle_1, \langle W\rangle_2) \cdot e(\langle Y\rangle_1, \langle 1\rangle_1 \langle \beta\rangle_2)^{-1} = e(\langle H\rangle_1, \langle r_y t\rangle_2) \quad (25)$$

where $\langle V\rangle_1 = \langle V_{mid}\rangle_1 + \Sigma_{i=0}^l x_i \cdot \langle r_v v_i\rangle$; $\langle W\rangle_2 = \langle W_{mid}\rangle_2 + \Sigma_{i=0}^l x_i \cdot \langle r_w w_w\rangle_2$; and $\langle Y\rangle_1 = \langle Y_{mid}\rangle_1 + \Sigma_{i=1}^l x_0 \cdot \langle r_y y_i\rangle_1$ with $x_0=1$. In the above check, the verifier 10 checks the consistency between the representations of the internal wires in the computation ($V_{mid}$, $W_{mid}$ and $Y_{mid}$) and that these are consistent with the trusted input representation (trusted input commitment).

It will be appreciated that it is important that the central authority 4 is distinct from the worker 8 (although the central authority 4 and trusted source 6 may be the same party). This is because the central authority 4 is technically able to produce proofs of incorrect statements and to modify trusted inputs after the trusted input representation (trusted input commitment) has been defined.

Strictly speaking, the cryptographic security proof relies on the trusted input verification/evaluation key being specific to a single trusted source 6, and the computation verification/evaluation key being specific to a single worker 8 and function. However, in practical deployments, the same keys may be used by different trusted sources 6 and workers 8.

The public parameters, trusted input evaluation (commitment) key, trusted input verification key, computation evaluation key and computation verification key can all be published without affecting the security or privacy of the algorithm. Only the trusted inputs and the outputs need to be kept secret. In practice, the central authority 4 can make the public parameters, trusted input verification key, and computation verification key open to the public by publishing them digitally signed, e.g. on a website. The central authority 4 can provide the trusted input evaluation key directly to the trusted source 6 (indicated by arrow 30 in FIG. 1), and the computation evaluation key directly to the worker 8 (indicated by arrow 32 in FIG. 1). Arrow 30 can also represent the trusted source node 6 obtaining the public parameters from the central authority 4. Likewise, arrow 32 can also represent the worker node 8 obtaining the public parameters from the central authority. The trusted source 6 provides the trusted inputs to the worker 8 over a private channel (represented by arrow 34 in FIG. 1), and publishes the trusted input representation/commitment, e.g., digitally signed on a website. The verifier 10 obtains the trusted input representation (indicated by arrow 36 in FIG. 1). The verifier 10 may also provide computation inputs over a secure channel to the worker 8 (indicated by arrow 38 in FIG. 1), who returns the outputs and proof over the same secure channel to the verifier 10 (indicated by arrow 40 in FIG. 1). Alternatively, if the inputs and/or outputs are supposed to be public, these can be published. The verifier 10 can also obtain the public parameters, trusted input verification key and computation verification key, and this is indicated by arrow 42 from the central authority 4 to the verifier 10 in FIG. 1.

It will be appreciated that the arrows in FIG. 1 mentioned above are each associated with the various objects (i.e. keys, the input representation, public parameters, etc.) used in the algorithm, and each arrow starts at a node that constructs a certain object and ends at a node that uses the object. Thus, it should be appreciated that (particularly in the case of an object being published), the arrows in FIG. 1 do not necessarily indicate a direct transfer of the object from one node to another, and in some cases the object may pass through one or more other devices, components or nodes.

As extension to the above algorithm, trusted inputs may be provided by multiple sources. In the above algorithm, each computation involves trusted inputs from only one input source 6. The algorithm can be extended to support input from multiple sources by considering the elements $$\langle V_{mid}\rangle_1, \langle \alpha_v V_{mid}\rangle_1, \langle W_{mid}\rangle_2, \langle \alpha_w W_{mid}\rangle_1, \langle Y_{mid}\rangle_1, \langle \alpha_y Y_{mid}\rangle_1, \langle Z\rangle_1 \quad (26)$$

from the proof as a "commitment" to the values $x_{l+1}, \ldots, x_n$. For each additional trusted source 6, another commitment of the form (7) is included just to the values coming from that trusted source 6, with a fresh value for $\beta$. Note that the commitment in (7) uses s-powers with exponents $l+1, \ldots, m$ whereas the inputs from another trusted source would in general have wire indices $l+1+\delta, \ldots, m+\delta$ for some offset $\delta$. To account for this, evaluation key elements $\langle \beta \cdot (s^k + r_v v_k + r_w w_k + r_y y_k)\rangle_1$ are used. The verifier 10 repeats the checks in equations (20)-(24) for each of these commitments, and the check in equation (25) is adjusted so that values $\langle V\rangle_1, \langle W\rangle_2, \langle Y\rangle_1$ include the commitments. In the same way, separate commitments may be used for the inputs by the first trusted source and for the internal wires of the computation.

FIGS. 3-6 are flow charts that illustrate exemplary methods of operating a central authority node 4, input node 6, worker node 8 and verifier node 10 respectively according to the techniques presented herein.

Figure 3:
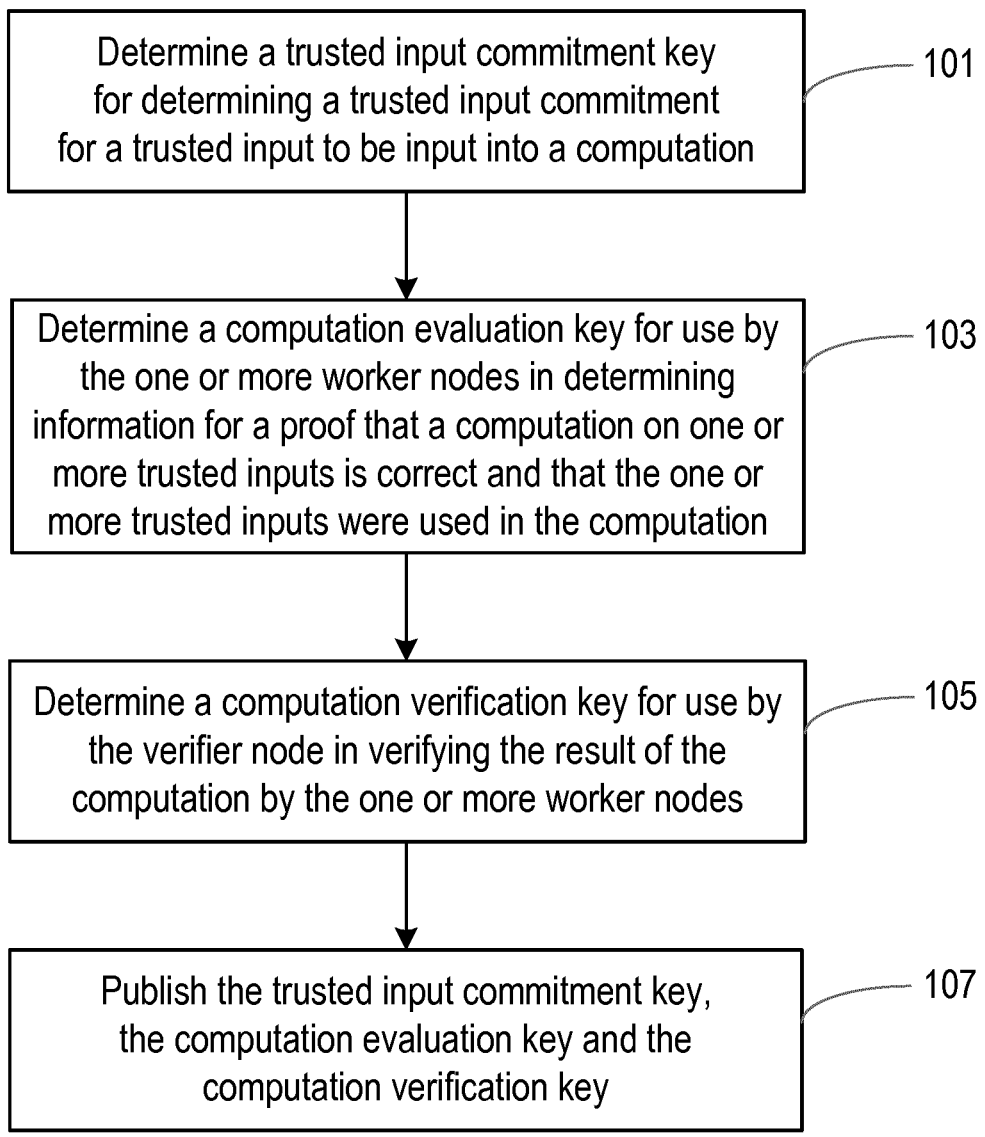
FIG. 3 is a flow chart illustrating exemplary operations of a central authority node according to various embodiments.

Thus, FIG. 3 is a flow chart that illustrates the steps in the method or steps in the operation of the central authority node 4 (also referred to as a first node 4). The steps can be performed by the processing unit 22 and/or the interface circuitry 20 as appropriate. In some embodiments, the processing unit 22 can perform the steps as a result of executing suitable program code stored in the memory unit 24.

As noted above, the central authority node 4 provides the keys used by the other nodes 6, 8, 10 in the system to perform a computation on a trusted input in a secure way and enable a verifier node 10 to verify the correctness of the computation.

In a first step, step 101, the central authority node 4 determines a trusted input commitment key (also referred to as the trusted input evaluation key). The trusted input commitment key will be used by an input node 6 (trusted source node 6) in forming a trusted input commitment of one or more trusted inputs.

The central authority node 4 also determines a computation evaluation key (step 103). The computation evaluation key is for use by the one or more worker nodes 8 in determining a proof that the computation on one or more trusted inputs is correct and that the one or more trusted inputs were used in the computation.

The computation includes one or more wires for inputting the trusted input (which are referred to as trusted input wires), and the computation evaluation key comprises key material for the one or more trusted input wires. This key material is derived from a trapdoor value s, one or more polynomials evaluated in (or at) a point corresponding to the trapdoor value that are independent of polynomials representing the computation, and one or more polynomials evaluated in (or at) a point corresponding to the trapdoor value that are dependent on polynomials representing the computation.

The central authority node 4 also determines a computation verification key (step 105) that is for use by the verifier node 10 in verifying the result of the computation by the one or more worker nodes 8.

It will be appreciated that steps 101, 103 and 105 can be performed in the same or different order to that shown in FIG. 3, or all three steps can be performed at substantially the same time.

Next, the central authority node 4 publishes the trusted input commitment key, the computation evaluation key and the computation verification key (step 107). By publishing the keys, the central authority node 4 makes the keys available for any node 6, 8, 10 in the system 2 to access. Publishing the keys can mean storing them in a location that is accessible by the other nodes 6, 8, 10, for example in memory unit 24 if that is accessible by the other nodes 6, 8, 10, or storing them on a server or other computer that is accessible via the Internet or other network. As noted above, publishing the keys may be in a digitally signed form.

It will be appreciated that in embodiments where the central authority node 4 determines the various keys at different times, the central authority node 4 can publish each key as it is determined, rather than wait until all keys are derived before publishing.

In some embodiments, the key material for each trusted input wire in the computation evaluation key includes an encoding of the product of a secret value $\beta$ and the combination of a computation-independent polynomial evaluated in a point corresponding to the trapdoor value that represents the trusted input wire and one or more computation-dependent polynomials evaluated in a point corresponding to the trapdoor value that represent how the wire is used in the computation. It will be appreciated that, since the inverse $\beta^{-1}$ of a secret value is again a secret value, instead of multiplication by $\beta$ one can equivalently perform multiplication by $\beta^{-1}$, i.e., division by $\beta$ when constructing the key material. Below we will not consider this alternative formulation separately.

More specifically, the key material for the one or more trusted input wires can comprise:

$$\langle \beta \cdot (s^k + r_v v_k + r_w w_k + r_y y_k) \rangle_1 \quad (27)$$

where k is a label representing each trusted input wire, s is the trapdoor value, $\beta$, $r_v$ and $r_w$ are random values and $r_y = (r_v \cdot r_w)$ for each trusted input, $v_k$, $w_k$ and $y_k$ are polynomials evaluated at s that represent the computation. In particular, and as defined above $v_k$ represents the way that the respective trusted input wire is used in the left factor, $w_k$ represents the way that the respective trusted input wire is used in the right factor, and $y_k$ represents the way that the respective trusted input wire is used in the product of the set of multiplications that make up the computation. $\langle f \rangle_1$ for polynomial f denotes an additively homomorphic encoding of the ring element f(s), as discussed above. It will be appreciated that the key material in equation (27) is also found in the key material set out in equation (9). It will further be appreciated that, by means of the change of variables $\delta := 1/(\beta r_y)$, $\epsilon := 1/r_y$, $\alpha := 1/r_v$, $\beta' := 1/r_w$, formula (27) may equivalently be written as $$\left\langle \frac{\epsilon s^k + \beta' v_k + \alpha w_k + y_k}{\delta} \right\rangle_1.$$

Below we will not consider this alternative formulation separately.

In some embodiments, to further improve the security of the algorithm, the central authority node 4 can also determine and publish a trusted input verification key. The trusted input verification key is for use by the verifier node 10 in verifying the authenticity of the trusted inputs that are input into the computation. This key can be published in the same way as the other keys above in step 107.

Figure 4:
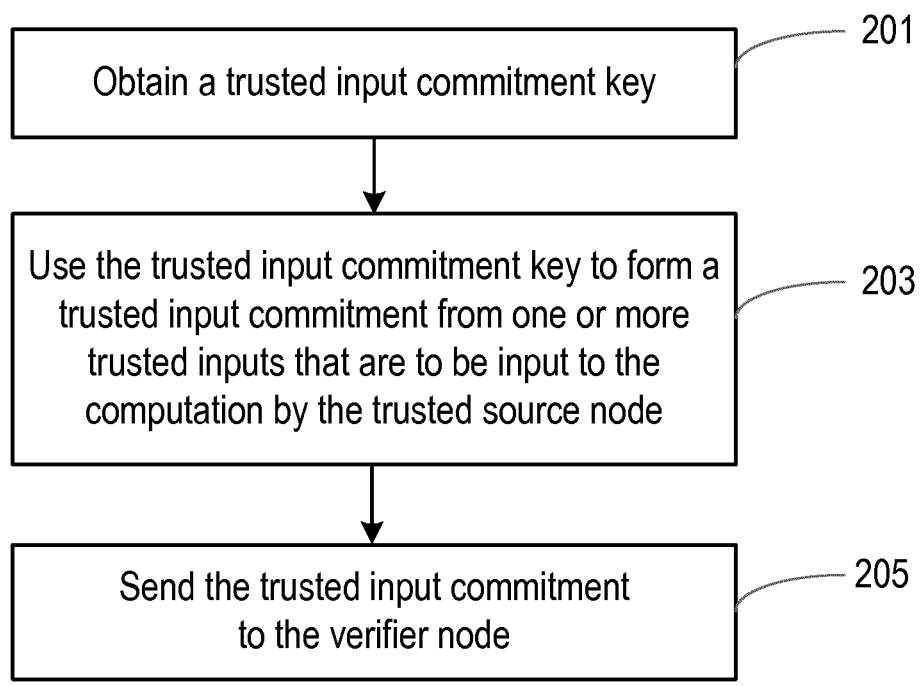
FIG. 4 is a flow chart illustrating exemplary operations of a trusted input node according to various embodiments.

FIG. 4 is a flow chart that illustrates the steps in the method or steps in the operation of the trusted source node 6 (also referred to as an input node 6). The steps can be performed by the processing unit 22 and/or the interface circuitry 20 as appropriate. In some embodiments, the processing unit 22 can perform the steps as a result of executing suitable program code stored in the memory unit 24.

The trusted source node 6 has one or more trusted inputs 6 that are to be input to a computation.

In step 201, the trusted source node 6 obtains a trusted input commitment key. As noted above, the central authority node 4 determines and publishes the trusted input commitment key. Thus, in step 201, the trusted source node 6 can obtain the published trusted input commitment key.

Next, in step 203, the trusted source node 6 uses the trusted input commitment key to form a trusted input commitment for the one or more trusted inputs that are to be input to the computation. The trusted input commitment can be as defined in equation (7) above.

The trusted source node 6 then sends the trusted input commitment to the verifier node 10 (step 205).

The trusted source node 6 also sends the one or more trusted inputs to the one or more worker nodes 8 for input to the computation.

Figure 5:
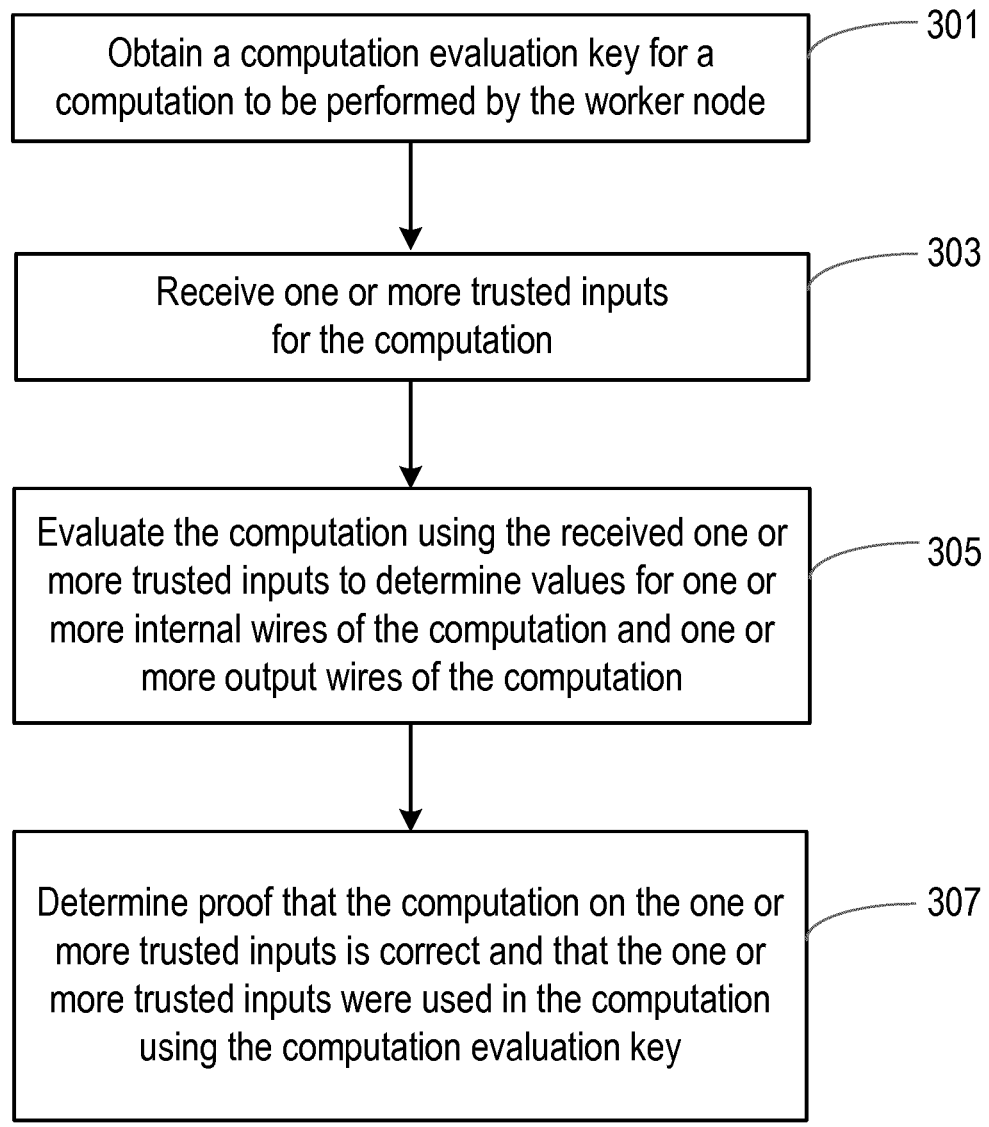
FIG. 5 is a flow chart illustrating exemplary operations of a worker node according to various embodiments.

FIG. 5 is a flow chart that illustrates the steps in the method or steps in the operation of a worker node 8. The steps can be performed by the processing unit 22 and/or the interface circuitry 20 as appropriate. In some embodiments, the processing unit 22 can perform the steps as a result of executing suitable program code stored in the memory unit 24.

In step 301, the worker node 8 obtains a computation evaluation key. As noted above, the central authority node 4 determines and publishes the computation evaluation key. Thus, in step 301, the worker node 8 can obtain the published computation evaluation key. The computation evaluation key can comprise any of the various embodiments of the key material set out above with reference to step 103.

Next, in step 303, the worker node 8 receives one or more trusted inputs for the computation from the trusted source node(s) 6 and/or from the verifier node 10.

In step 305 the worker node 8 evaluates the computation using the received one or more trusted inputs to determine values for one or more internal wires of the computation and one or more output wires of the computation (which represent the output of the computation). The trusted inputs are input to the computation using one or more trusted input wires of the computation.

Finally, in step 307 the worker node 8 determines a proof that the computation on the one or more trusted inputs is correct and that the one or more trusted inputs were used in the computation. This proof is determined using the computation evaluation key. The determined proof can be sent to the verifier node 10, e.g. when the information is determined, or in response to a request from the verifier node 10 for proof information.

In some embodiments, the worker node determines the proof by determining encodings (e.g. V, W, Y above) of the contributions of a set of input wires including the trusted input wires to left factors, right factors and products of the multiplications that form the computation using the key material described above based on the one or more polynomials that are dependent on polynomials representing the computation.

In some embodiments, the proof comprises an element Z that is for use in verifying that the commitment for the trusted input wires and the encodings of the contributions consistently use the same values for the trusted input wires.

In some embodiments, element Z is a linear combination of $$\langle \beta \cdot (s^k + r_v v_k + r_w w_k + r_y y_k) \rangle_1 \quad (28)$$

according to the homomorphic encoding scheme used, with coefficients given by the trusted input wires and where $\langle f \rangle$, for polynomial f, is an additively homomorphic encoding of the ring element f(s).

In alternative embodiments, element Z comprises:

$$\langle z \rangle_1 = \Sigma_j x_j \langle \beta \cdot (r_v v_j + r_w w_j + r_y y_j) \rangle_1 + \Sigma_k x_k \langle \beta \cdot (s^k + r_v v_k + r_w w_k + r_y y_k) \rangle_1, \quad (29)$$

where $\langle f \rangle$, for polynomial f, is an additively homomorphic encoding of the ring element f(s).

In other alternative embodiments, element Z comprises:

$$\langle Z \rangle_1 = \delta_v \cdot \langle r_v \beta t \rangle_1 + \delta_w \cdot \langle r_w \beta t \rangle_1 + \delta_y \cdot \langle r_y \beta t \rangle_1 + \Sigma_j x_j \langle \beta \cdot (r_v v_j + r_w w_j + r_y y_j) \rangle_1 + \Sigma_k x_k \langle \beta \cdot (s^k + r_v v_k + r_w w_k + r_y y_k) \rangle_1, \quad (30)$$

where $\langle f \rangle$, for polynomial f, is an additively homomorphic encoding of the ring element f(s).

In implementations where the system 2 comprises at least one other worker node 8 (e.g. in an implementation based on Trinocchio), the worker node 8 evaluates the computation in step 305 as a multiparty computation with the other worker node(s) 8. In these embodiments, the worker node 8 can determine the proof in step 307 as a multiparty computation with the other worker node(s) 8. Also in these embodiments, as the worker node 8 may have received a secret share of the trusted input and determined a secret share of the result of the computation, the worker node 8 may determine a secret share of the proof (with the other secret share(s) of the proof being determined by the other worker node(s) 8).

Figure 6:
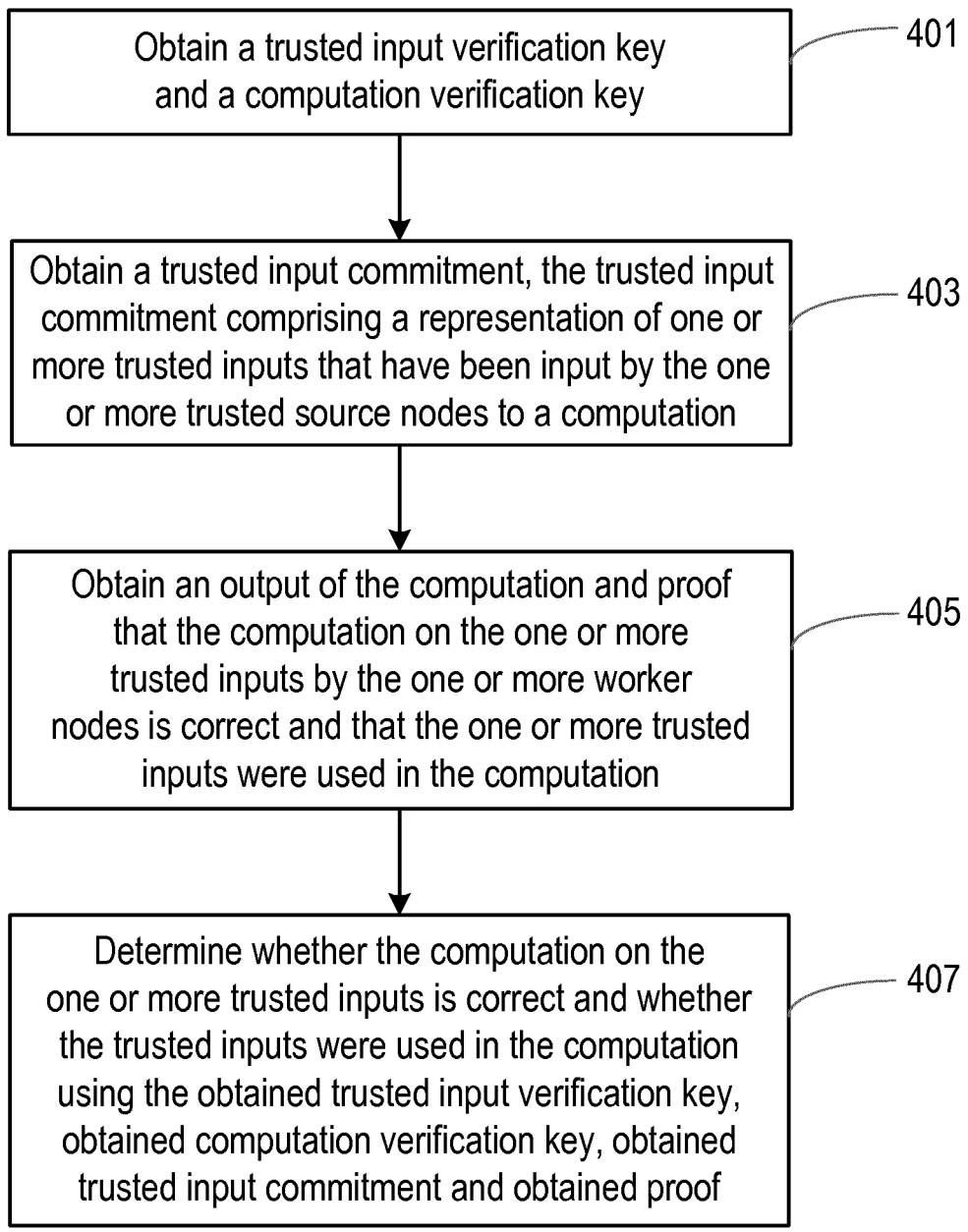
FIG. 6 is a flow chart illustrating exemplary operations of a verifier node according to various embodiments.

FIG. 6 is a flow chart that illustrates the steps in the method or steps in the operation of a verifier node 10. The steps can be performed by the processing unit 22 and/or the interface circuitry 20 as appropriate. In some embodiments, the processing unit 22 can perform the steps as a result of executing suitable program code stored in the memory unit 24.

In step 401, the verifier node 10 obtains a trusted input verification key and computation verification key. As noted above, the central authority node 4 determines and publishes the trusted input verification key and the computation verification key. Thus, in step 401, the verifier node 10 can obtain the published trusted input verification key and the published computation verification key. The trusted input verification key and the computation verification key can be as described above (e.g. $\langle \gamma \rangle_2$ and equation (10) respectively).

In step 403, the verifier node 10 obtains a trusted input commitment from the one or more trusted source nodes 6 that provided a trusted input to the computation to be verified by the verifier node 10. The trusted input commitment comprises a representation of one or more trusted inputs that have been input by the one or more trusted source nodes 6 to the computation. The trusted input commitment may be as shown in equation (7) above.

In step 405, the verifier node 10 obtains an output of the computation and a proof that the computation on the one or more trusted inputs by the one or more worker nodes is correct and that the one or more trusted inputs were used in the computation. The output and the proof are obtained from the worker node(s) 8 that performed the computation.

It will be appreciated that steps 401, 403 and 405 can be performed in the same or different order to that shown in FIG. 6, or all three steps can be performed at substantially the same time.

Next, in step 407, the verifier node 10 determines whether the computation on the one or more trusted inputs is correct and whether the trusted inputs were used in the computation. This is determined using the trusted input verification key, the computation verification key, the trusted input commitment and the proof.

In some embodiments, the proof comprises encodings (e.g. V, W, Y above) of the contributions of a set of wires including trusted input wires to left factors, right factors and products of the multiplications that form the computation.

In some embodiments, the proof comprises an element Z that is for use in verifying that the plurality of encodings are consistent with each other and that the plurality of encodings are consistent with the trusted input commitment for the computation. The element Z can be as set out above with reference to any of the embodiments of step 307.

In some embodiments, in step 407 the verifier node 10 determines whether the computation on the one or more trusted inputs is correct and whether the trusted inputs were used in the computation by verifying that the plurality of encodings are consistent with each other and that the plurality of encodings are consistent with the trusted input commitment for the computation.

In some embodiments, in step 407 the verifier node 10 determines whether the value encoded by element Z equals the value encoded by a random value multiplied by the sum of the values encoded by the encodings of the contributions of the set of wires including the trusted input wires to the left factors, the right factors, the products of the multiplications that form the computation and an encoding of a representation of the trusted input wires included in the trusted input commitment.

In particular embodiments, in step 407 the verifier node 10 determines whether the computation on the one or more trusted inputs is correct and whether the trusted inputs were used in the computation by evaluating:

$$e(\langle 1 \rangle_1, \langle 1 \rangle_2)^{\beta \cdot (I+V_{mid}+W_{mid}+Y_{mid})} \text{ and } e(\langle 1 \rangle_1, \langle 1 \rangle_2)^z \quad (31)$$

and verifying that they are equal, where I is the representation of the trusted input wires included in the trusted input commitment; $V_{mid}$, $W_{mid}$, $Y_{mid}$ are the representations of the contributions of the set of input wires including the trusted input wires to the left factors, the right factors, and the products of the multiplications that form the computation; P is the random value; z is the value encoded by element Z; $\langle \bullet \rangle_1$, $\langle \bullet \rangle_2$ are homomorphic encodings that are used to encode the values I, $V_{mid}$, $W_{mid}$, $Y_{mid}$, β, and z; and e is a bilinear map defined on the two encodings.

In some embodiments, the homomorphic encodings $\langle x \rangle_1$, $\langle x \rangle_2$ are $g_1^x$, $g_2^x$ with $g_1$, $g_2$ generators of discrete logarithm groups and e is a cryptographic pairing.

The verifier node 10 can evaluate equation (31) by evaluating:

$$e(\langle I \rangle_1 + \langle V_{mid} \rangle_1 + \langle Y_{mid} \rangle_1, \langle \beta \rangle_2) \cdot e(\langle \beta \rangle_1, \langle W_{mid} \rangle_2) = e(\langle Z \rangle_1, \langle 1 \rangle_2) \quad (32)$$

In some embodiments, the homomorphic encodings $\langle x \rangle_1$, $\langle x \rangle_2$ are both encryptions under the same public key with the same homomorphic encryption scheme, $e(\langle x \rangle_1, \langle y \rangle_2)$ represents the value x·y obtained by decrypting $\langle x \rangle_1$ and $\langle y \rangle_2$ and multiplying the results, and $e(\langle x \rangle_1, \langle y \rangle_2)^z$ represents the value x·y·z obtained by decrypting $\langle x \rangle_1$ and $\langle y \rangle_2$ and multiplying the result with z.

It will be understood that, in the above description where homomorphic encodings are elements from a discrete logarithm group and the bilinear map e is a cryptographic pairing on the discrete logarithm group, several variations are possible. In particular, it is possible to use a symmetric pairing (in which case the two discrete logarithm groups $\mathbb{G}_1$, $\mathbb{G}_2$ are the same) or an asymmetric pairing (in which case the two discrete logarithm groups $\mathbb{G}_1$, $\mathbb{G}_2$ are different). It is also possible to (independently) change the discrete logarithm group used for the various elements in the various keys, commitments, and proofs. For instance, computation proofs may contain a proof element $\langle V_{mid} \rangle_2 = \Sigma_i x_i \cdot \langle r_v v_i \rangle_2 + \delta_v \cdot \langle r_v t \rangle_2$ instead of $\langle V_{mid} \rangle_1 = \Sigma_i x_i \cdot \langle r_v v_i \rangle_1 + \delta_v \cdot \langle r_v t \rangle_1$ if the respective key material is changed appropriately to contain encodings $\langle r_v v_i \rangle_2$, $\langle r_v t \rangle_2$, $\langle \alpha_v \rangle_2$ instead of $\langle r_v v_i \rangle_1$, $\langle r_v t \rangle_1$, $\langle \alpha_v \rangle_1$ and the verification procedure is changed to check, among other things, that $e(\langle \alpha_v \rangle_1, \langle V_{mid} \rangle_2) = e(\langle \alpha_v V_{mid} \rangle_1, \langle 1 \rangle_2)$.

The above-described nodes, systems and methods have several potential applications. Some examples are outlined below.

A wearable biosensor measures data of a customer and thereby acts as trusted source; an insurance company wants to have statistics on this data to evaluate a premium for the customer. The biosensor cannot compute the data on its own so the data needs to be outsourced, but the insurer wants to be convinced of the correctness. Here, the party orchestrating the methods herein can be the central authority and producer of the biosensor; the processing of the data can then be outsourced to the customer while correctness is still guaranteed.

Governments periodically publish health statistics to inform the public. These statistics can be authenticated with respect to the data by the hospitals and other medical organizations so that the public is sure they are correct. In this case, the party orchestrating the methods herein could act as trusted party independent from both the trusted sources (medical organizations) and worker (the government).

A smart meter produces readings but does not have the computational power to compute an aggregate report on this, or the aggregate report format may change over time. Hence this is outsourced to the owner of the smart meter. But the energy company wants to be sure that the aggregate report has not been manipulated by the owner to reduce her electricity bill.

Similarly, the scheme can be used for pay-as-you-drive insurance.

A bookkeeper authenticates financial data of an organization. Based on proofs an auditor can check that certain processes were followed correctly.

The system could be deployed for consumers to get loyalty discounts based on payment information provided by sales terminals, without the shop knowing details about the consumer's purchases (assuming the shop cannot see what happens inside the sales terminals).

The system could be deployed to allow multiple verifiable computations to refer to a common shared state. For instance, one verifiable computation could have an output x that is used as an input to a second verifiable computation. In this case, x could be regarded as a trusted input to both the first verifiable computation and the second verifiable computation, and the techniques described herein would allow a verifier to check that the same value x was used in both computations without needing to know x.

In distributed ledgers such as the Ethereum blockchain, verifiable computation can be used as a means to prove correctness of transactions while keeping their contents hidden, and while keeping the verification effort independent from the complexity of the description of the transaction. This system enables such verifiable computations to efficiently refer back to trusted inputs by a third party, and it enables multiple such verifiable computations, possibly of different types), to share a state without disclosing it.

There are therefore provided improved techniques and algorithms that enable trusted sources to outsource computations on their data to an untrusted worker, and any external party can cryptographically verify the correctness of the computation result, while minimising the overhead for both the worker and a verifier.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the

The invention claimed is:

1. A first node for use in a communication network system, the system comprising one or more trusted source nodes, the one or more worker nodes and a verifier node, wherein the first node, the one or more trusted sources nodes, one or more worker nodes and the verifier node are electronic devices, wherein the first node is configured to:
   determine a trusted input commitment key for a trusted input to be input into a computation that is evaluated by the one or more worker nodes, wherein the trusted input commitment key is for use by the one or more trusted source nodes in forming a trusted input commitment of one or more trusted inputs;
   determine a computation evaluation key for use by the one or more worker nodes in determining a proof that a computation on one or more trusted inputs is correct and that the one or more trusted inputs were used in the computation, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that represent the computation;
   determine a computation verification key for use by the verifier node in verifying the result of the computation by the one or more worker nodes; and
   publish the trusted input commitment key, the computation evaluation key and the computation verification key to make the keys available for nodes within the system.

2. A first node as claimed in claim 1, wherein the key material for each trusted input wire includes an encoding of the product of a secret value and the combination of a computation-independent polynomial evaluated in a point corresponding to the trapdoor value representing the trusted input wire and one or more computation-dependent polynomials evaluated in a point corresponding to the trapdoor value that represent how the wire is used in the computation.

3. A method of operating a first node in a system, the system comprising one or more trusted source nodes, one or more worker nodes and a verifier node, wherein the method comprises:
   determining a trusted input commitment key for a trusted input to be input into a computation that is to be evaluated by the one or more worker nodes, wherein the trusted input commitment key is for use by the one or more trusted source nodes in forming a trusted input commitment of one or more trusted inputs;
   determining a computation evaluation key for use by the one or more worker nodes in determining a proof that a computation on one or more trusted inputs is correct and that the one or more trusted inputs were used in the computation, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that represent the computation;
   determining a computation verification key for use by the verifier node in verifying the result of the computation by the one or more worker nodes; and
   publishing the trusted input commitment key, the computation evaluation key and the computation verification key.

4. A non-transitory computer program product comprising a computer readable medium having computer readable code embodied therein, the computer readable code being configured such that, on execution by a suitable computer or processor, the computer or processor is caused to perform the method of claim 3.

5. A worker node for use in a communication network system, the system comprising a first node, one or more trusted source nodes and a verifier node, wherein the worker node, the first node, the one or more trusted sources nodes, and the verifier node are electronic devices wherein the worker node is configured to:
   obtain a computation evaluation key for a computation to be performed by the worker node, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that are dependent on polynomials representing the computation;
   receive one or more trusted inputs for the computation;
   evaluate the computation using the received one or more trusted inputs to determine values for one or more internal wires of the computation and one or more output wires of the computation;
   and determine a proof that the computation on the one or more trusted inputs is correct and that the one or more trusted inputs were used in the computation using the computation evaluation key, wherein the determined proof is sent to the verifier node.

6. A worker node as claimed in claim 5, wherein the key material for each trusted input wire includes an encoding of the product of a secret value and the combination of a computation-independent polynomial evaluated in a point corresponding to the trapdoor value representing the trusted input wire and one or more computation-dependent polynomials evaluated in a point corresponding to the trapdoor value that represent how the wire is used in the computation.

7. A worker node as claimed in claim 5, wherein the key material for the one or more trusted input wires comprises:

$$\langle \beta \cdot (s^k + r_v v_k + r_w w_k + r_y y_k) \rangle_1$$

where k is a label representing each trusted input wire, s is the trapdoor value, $\beta$, $r_v$ and $r_w$ are random values and $r_y = (r_v \cdot r_w)$ for each trusted input, $v_k$, $w_k$ and $y_k$ are polynomials evaluated at s that represent the computation, with $v_k$ representing the way that the respective trusted input wire is used in the left factor, $w_k$ representing the way that the respective trusted input wire is used in the right factor, and $y_k$ representing the way that the respective trusted input wire is used in the product of the set of multiplications that make up the computation, $\langle \cdot \rangle_1$ is an additively homomorphic encoding, and $\langle f \rangle_1$ for polynomial f represents the additively homomorphic encoding of ring element f(s).

8. A method of operating a worker node in a system, the system comprising a first node, one or more trusted source nodes and a verifier node, wherein the method comprises:

obtaining a computation evaluation key for a computation to be performed by the worker node, wherein the computation evaluation key comprises key material for one or more trusted input wires that are for inputting the one or more trusted inputs into the computation, wherein the key material is derived from a trapdoor value, one or more polynomials evaluated in a point corresponding to the trapdoor value that are independent of polynomials representing the computation, and one or more polynomials evaluated in a point corresponding to the trapdoor value that are dependent on polynomials representing the computation;

receiving one or more trusted inputs for the computation;

evaluating the computation using the received one or more trusted inputs to determine values for one or more internal wires of the computation and one or more output wires of the computation; and determining a proof that the computation on the one or more trusted inputs is correct and that the one or more trusted inputs were used in the computation using the computation evaluation key.

9. A non-transitory computer program product comprising a computer readable medium having computer readable code embodied therein, the computer readable code being configured such that, on execution by a suitable computer or processor, the computer or processor is caused to perform the method of claim 8.

10. A verifier node for use in a communication network system, the system comprising a first node, one or more trusted source nodes and one or more worker nodes, wherein the verifier, the first node, the one or more trusted sources nodes, and one or more worker nodes are electronic devices, wherein the verifier node is configured to:

obtain a trusted input verification key and computation verification key;

obtain, from the one or more trusted source nodes, a trusted input commitment, the trusted input commitment comprising a representation of one or more trusted inputs that have been input by the one or more trusted source nodes to a computation;

obtain, from one or more worker nodes, an output of the computation and a proof that the computation on the one or more trusted inputs by the one or more worker nodes is correct and that the one or more trusted inputs were used in the computation;

and determine whether the computation on the one or more trusted inputs is correct and whether the trusted inputs were used in the computation using the obtained trusted input verification key, obtained computation verification key, obtained trusted input commitment and obtained proof, wherein the verifier node determines whether the computation on the one or more trusted inputs is correct and whether the trusted inputs were used in the computation by verifying that a plurality of encodings are consistent with each other and that the plurality of encodings are consistent with the trusted input commitment for the computation.

11. A verifier node as claimed in claim 10, wherein the computation comprises zero or more non-trusted input wires, one or more computation output wires, one or more trusted input wires and one or more internal wires, and wherein the proof comprises encodings representing the contributions of a set of input wires including the trusted input wires to left factors, right factors and products of the multiplications that form the computation.

12. A verifier node as claimed in claim 11, wherein the proof comprises an element Z that is for use in verifying that the plurality of encodings are consistent with each other and that the plurality of encodings are consistent with the trusted input commitment for the computation.

13. A verifier node as claimed in claim 12, wherein the verifier node is configured to determine whether the computation on the one or more trusted inputs is correct and whether the trusted inputs were used in the computation by verifying that the plurality of encodings are consistent with each other and that the plurality of encodings are consistent with the trusted input commitment for the computation.

14. A method of operating a verifier in a system, the system comprising a first node, one or more trusted source nodes and one or more worker nodes, wherein the method comprises:

obtaining a trusted input verification key and computation verification key;

obtaining, from the one or more trusted source nodes, a trusted input commitment, the trusted input commitment comprising a representation of one or more trusted inputs that have been input by the one or more trusted source nodes to a computation;

obtaining, from one or more worker nodes, an output of the computation and a proof that the computation on the one or more trusted inputs by the one or more worker nodes is correct and that the one or more trusted inputs were used in the computation; and determining whether the computation on the one or more trusted inputs is correct and whether the trusted inputs were used in the computation using the obtained trusted input verification key, obtained computation verification key, obtained trusted input commitment and obtained proof.

15. A non-transitory computer program product comprising a computer readable medium having computer readable code embodied therein, the computer readable code being configured such that, on execution by a suitable computer or processor, the computer or processor is caused to perform the method of claim 14.

* * * * *